J. C. WALTER.
MANURE LOADER.
APPLICATION FILED JAN. 20, 1910.
987,198.
Patented Mar. 21, 1911.
2 SHEETS—SHEET 2.
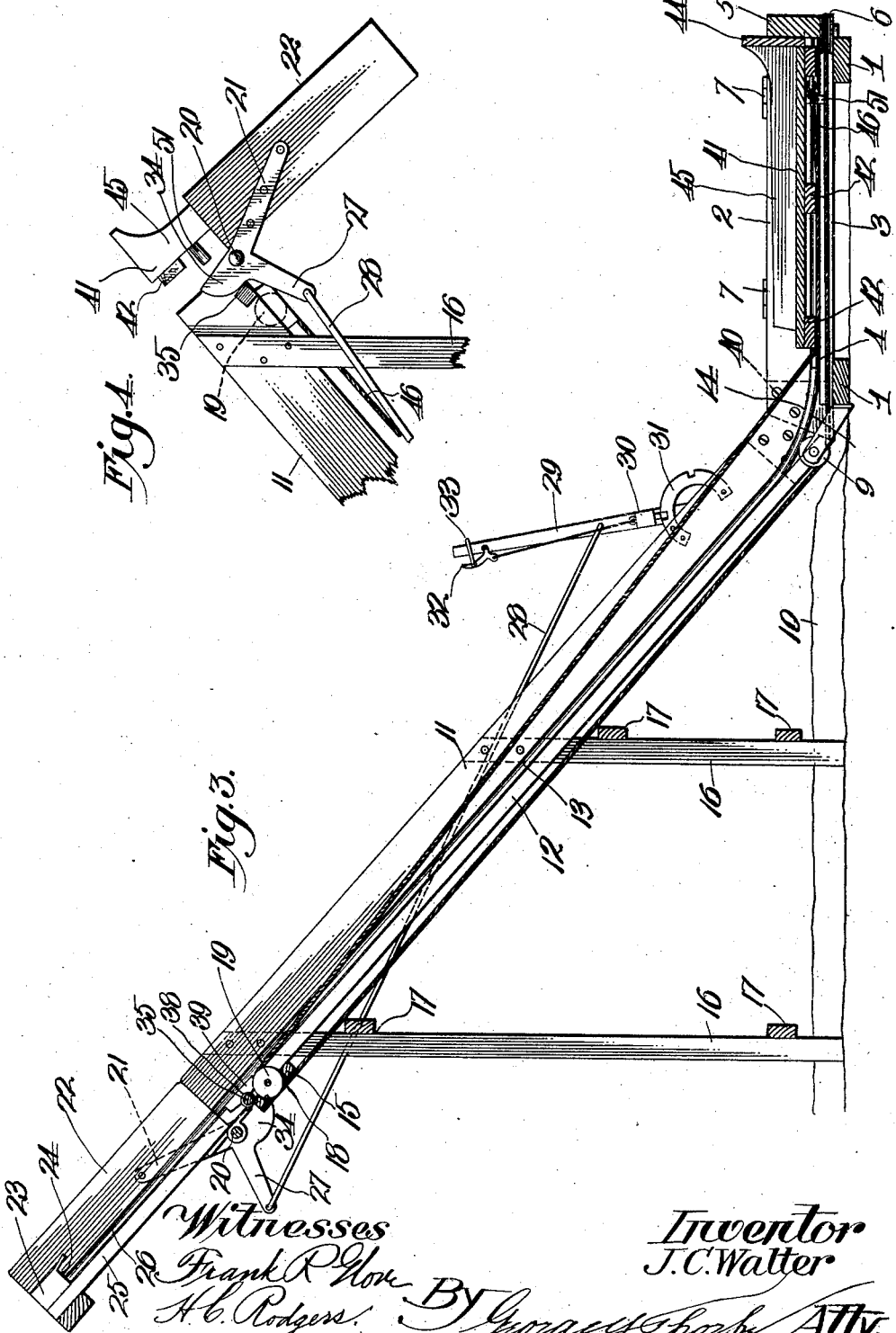

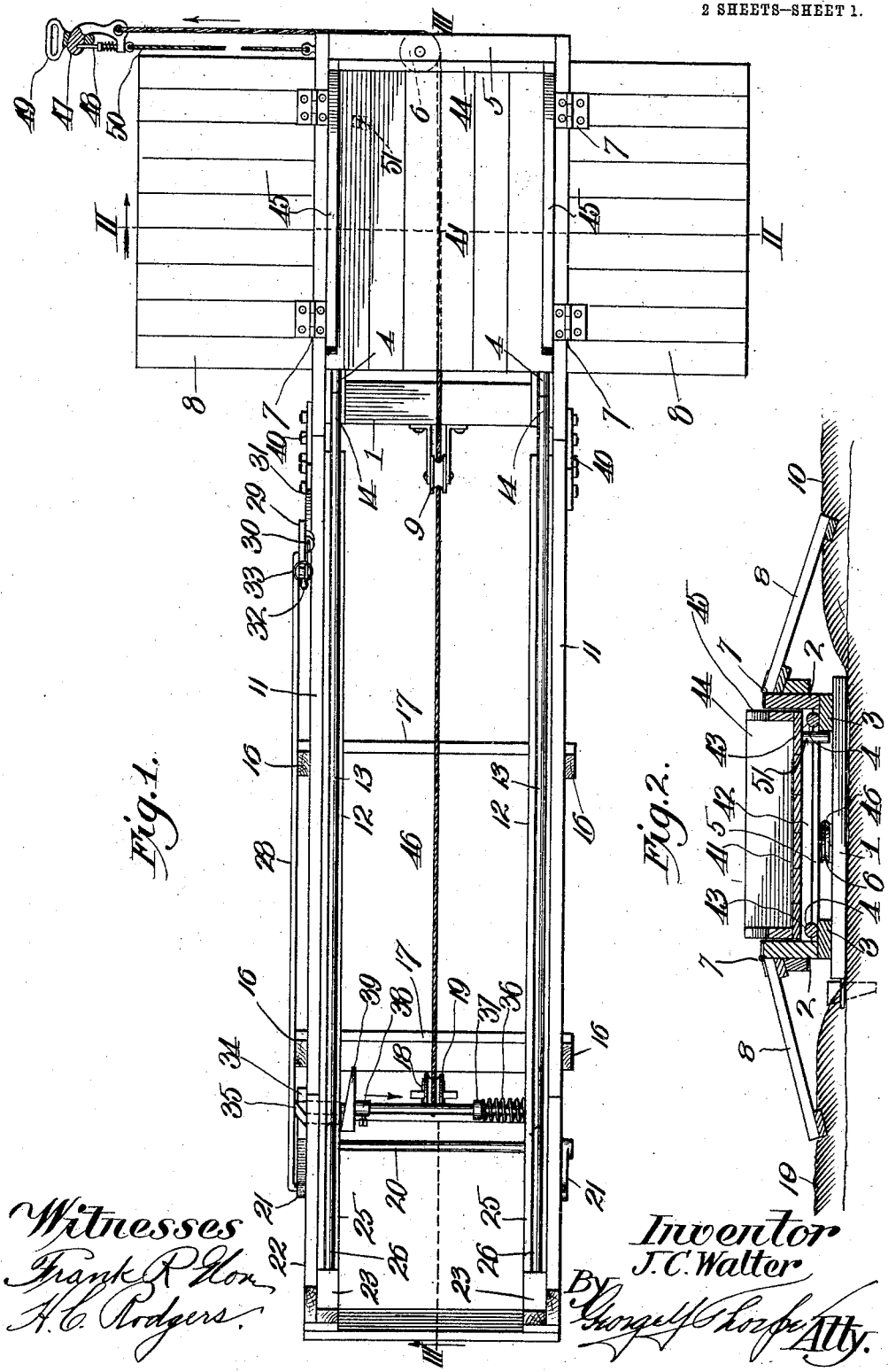

UNITED STATES PATENT OFFICE.

JOSEPH C. WALTER, OF LECOMPTON, KANSAS.

MANURE-LOADER.

987,198.  Specification of Letters Patent.  Patented Mar. 21, 1911.

Application filed January 20, 1910. Serial No. 539,155.

*To all whom it may concern:*

Be it known that I, JOSEPH C. WALTER, a citizen of the United States, residing at Lecompton, in the county of Douglas and State of Kansas, have invented certain new and useful Improvements in Manure-Loaders, of which the following is a specification.

This invention relates to manure loaders and is designed more particularly as an improvement in the manure loader on which I applied for patent Dec. 3, 1909, Ser. No. 531,254, my special object being to produce a manure loader of simpler, cheaper, stronger and more durable construction than that on which application is pending.

A further object is to produce a manure loader having an inclined trackway equipped with a dumping extension and a platform adapted for traveling upward on said trackway and causing said extension to swing downward to effect the discharge of the contents of the platform.

With these and other objects in view, the invention consists in certain novel and peculiar features of construction and organization as hereinafter described and claimed; and in order that it may be fully understood reference is to be had to the accompanying drawings, in which;

Figure 1, is a top plan view of a manure loader embodying my invention. Fig. 2, is a vertical section on the line II—II of Fig. 1. Fig. 3, is a section on the line III—III of Fig. 1. Fig. 4, is a side elevation of the upper end of the machine with the hinged track extension in dumping position.

In the said drawings where like reference characters identify corresponding parts in all of the figures, 1 indicates a pair of cross ties, and 2 parallel side bars secured upon the cross ties and provided at their inner sides with parallel stringers 3, which stringers preferably rest upon the cross ties 1 and carry parallel tracks 4. The side bars at one end are connected by an end bar 5, and suitably secured to and below the end bar and about midway the length of the same, is a horizontally-arranged grooved sheave 6.

Hinged as at 7 to the upper edges of the side bars 2, are wings 8 capable of being folded upon each other for convenience of transportation, and 9 indicates a vertically-disposed sheave suitably supported centrally and at the opposite end of the base member from sheave 6, for a purpose which hereinafter appears.

In practice, the base member, which the parts described constitute, is conveyed to the manure field and deposited upon the natural ground, the manure 10, being scraped away to permit of such disposition of said member. The wings are then unfolded to substantially the position shown in Figs. 1 and 2 so that they may form bridges to facilitate the travel of one or more draft animals and an ordinary dirt scraper transversely over said member.

The elevating member of the loader consists of a pair of inclined parallel side bars 11 provided with stringers 12 at their inner sides and tracks 13 upon the stringers. The lower ends of the tracks are preferably curved as shown at 14, and project beyond the opposite ends of the side bars 11.

15 is a cross bar connecting the side bars and stringers near their upper ends, and 16 indicates two sets of legs, the legs of each set being connected by cross bars 17, or they may be otherwise rigidly connected, and cross bar 15 is provided with a central opening 18 through which projects upward a suitably - journaled vertically - arranged sheave 19.

Suitably carried by and at the upper end of the elevating member is a transverse rock shaft 20, equipped at its ends with crank arms 21, carrying between them an extension dumping member 22, which corresponds in form to and forms normally a continuation of the elevating member and is provided at the ends of its tracks with stop-blocks 23 having their inner ends notched as at 24 for a purpose which hereinafter appears, the stringers and tracks of this hinged dumping extension being numbered 25 and 26 respectively. At one end the rock shaft is provided with a crank arm 27 connected by a link-rod 28 to a lever 29 mounted on the elevating member, provided with a latch mechanism 30 for engagement with the notched sector 31 carried by one of the side bars 11 adjacent to the base frame, the hand lever 32 of the latch mechanism being equipped with a bail 33, capable of being swung over the handle of lever 29 for the purpose of locking the latch mechanism in inoperative position as shown. At one end the rock shaft 20 is provided with a third crank arm 34, which normally underlies the beveled end of a latch bolt 35 extending transversely of and carried by the side bars 11, said latch bolt being held normally advanced under the yielding pressure of a spring 36, mounted on said bolt and bearing at its opposite ends against one of the side bars 11 and a collar 37 mounted on said bolt, the bolt being also provided with a collar 38 having a cam 39 which under a pressure applied by the longitudinally-moving bar hereinafter mentioned yields and withdraws the latch bolt from the path of crank arm 34 to permit the dumping extension to swing downward, though this dumping action can be prevented if desired, by disengaging the bail 33 from the handle of lever 29 to permit the latch mechanism to engage the sector 31 and thus lock said lever in position. The parts covered by reference characters 11 to 39 inclusive, can be carried to the field and set up at the desired point upon the legs 16, with the lower ends of bars 11 abutting against the free end of the side bars 2, and said parts are rigidly connected together in any suitable manner but preferably by plates 40, bolted to their outer sides, it being understood that the curved lower ends 14 of the tracks 13 fit endwise against tracks 4, and at their extremities rest upon the stringers underlying the last-named tracks.

41 is a platform provided with cross-cleats 42 having grooves 43 receiving the underlying tracks, the grooves being provided so that the platform may travel without contact with the sides 2, 11 and 22 of the members of the loader, and said platform is preferably provided with a high rear end-bar 44 and with low side bars 45, the latter being low so that horses walking across the platform, may step without difficulty over said sides, the latter and the end bar being provided to retain upon the platform material dumped thereon by the scraper or otherwise deposited thereon, the end bar being high to more reliably retain the material when the platform is traveling upward on the elevating member. 46 is a cable secured at one end to the rear cleat of said platform and extending thence under the platform and upward and around the sheave 19. From the under side of the latter it extends under sheave 9, and thence rearwardly to and around the sheave 6, from which it extends laterally and is equipped with a snap hook 47, the same being of the type provided with a spring actuated pin 48 to prevent the accidental disconnection from the hook of the clevis 49 attached to the swingle tree or double tree of an ordinary dirt scraper, not shown, and attached at its opposite ends to said pin and the base frame is a trip cord 50, of such length that when the platform has imposed the major part of its weight on the dumping extension, it will withdraw said pin and permit the clevis to slip off the end of the hook 47.

In actual operation the parts are arranged as shown, and the operator after gathering up a load of manure from the field drives his horse or team over one of the wings 8 and overturns the scraper in the usual manner so as to dump its contents upon the platform 41. As the scraper is drawn off the machine by way of the other wing, the operator engages the hook 47 with the clevis of the swingle tree or double tree so that the horse or horses without unnecessarily stopping shall start the cable 46 in the direction indicated by the arrow, Fig. 1, and thus cause the platform to move upward until the major portion of its weight is disposed upon the dumping extension. As this occurs the trip cord 50 becomes taut and withdraws pin 48 so that the clevis shall slip off the hook. At about the same moment the pin 51 depending from and near the rear end of the traveling platform, engages the cam 39, and starts the same in the direction indicated by the adjacent arrow, Fig. 1, and thus withdraws the latch bolt from the path of the crank arm 34 and permits the dumping extension with the platform thereon to swing downward as indicated in Fig. 4, the stop blocks 23 preventing the platform from sliding beyond a predetermined point, it being also noticed that the front end of the platform will enter the notches 24 and check any tendency of the platform to topple forward out of the dumping extension. The cable furthermore tends to restrain the platform from such toppling action and will prevent it without the coöperation of the notched ends of the stop blocks if the horse is not disengaged from the snap hook 27. Under ordinary conditions a horse will be employed to walk forward and backward alternately to raise and dump the platform and permit the same to be returned to its original position, and in such case the use of the cord will be dispensed with. After the dumping action, the operator grasps the lever 39 and swings it forwardly and through the instrumentality of the link 28 and the rock shaft reëlevates the dumping extension and the empty platform, the crank arm 34 repressing the latch 35 as it passes the same. When the extension attains its elevated position, the latch 35 snaps over the arm 34 and holds the extension in such position, the platform sliding down upon the tracks to its original position where it is ready for another load and, to repeat the operations described, and in this connection it will be noticed that the arm 34 is of such proportion that it effects the retraction of the bevel-ended latch before the down or return movement of the platform begins, this being necessary in order to remove the cam from the path of return movement of the pin 51 of said platform.

From the above description it will be apparent that I have produced a manure loader embodying the features of advantage enumerated as desirable and I wish it to be understood that I do not desire to be restricted to the exact details of construction shown and described as obvious modifications will suggest themselves to one skilled in the art.

Having thus described the invention what I claim as new and desire to secure by Letters-Patent, is:—

1. A manure loader, comprising a base member provided with tracks, an inclined elevating member arranged near the base member and provided with similar alined tracks abutting at their lower ends against the tracks of the base member, a dumping extension at the upper end of the elevating member and bearings a pivoted relation thereto and provided with tracks alined with those of the elevating member, a traveling platform normally upon the tracks of the base member, sheaves adjacent to the base member and the upper end of the elevating member, a cable engaging said sheaves and attached at one end to the traveling platform and arranged so that a sufficient pull upon its free end shall cause said platform to travel upon said alined tracks until its center of gravity is imposed on the dumping extension beyond the pivotal point thereof, means when said platform has attained such position for tripping said dumping extension to permit it to swing downward with the superposed platform to discharge the contents of the latter, means for effecting the release of the free end of the cable, and means to prevent the platform from sliding off the depressed end of the dumping extension when the latter swings downward.

2. A manure loader, comprising a base member provided with tracks, an inclined elevating member arranged near the base member and provided with similar alined tracks abutting at their lower ends against the tracks of the base member, a dumping extension at the upper end of the elevating member and bearing a pivoted relation thereto and provided with tracks alined with those of the elevating member, a traveling platform normally upon the tracks of the base member, sheaves adjacent to the base member and the upper end of the elevating member, a cable engaging said sheaves and attached at one end to the traveling platform and arranged so that a sufficient pull upon its free end shall cause said platform to travel upon said alined tracks until its center of gravity is imposed on the dumping extension beyond the pivotal point thereof, means when said platform has attained such position for tripping said dumping extension to permit it to swing downward with the superposed platform to discharge the contents of the latter, means for effecting the release of the free end of the cable, and stops to engage and overlap the front end of the platform when in dumping position to prevent said platform from toppling forward off the extension.

3. A manure loader, comprising a base member provided with tracks, an inclined elevating member arranged near the base member and provided with similar alined tracks abutting at their lower ends against the tracks of the base member, a dumping extension at the upper end of the elevating member and bearing a pivoted relation thereto and provided with tracks alined with those of the elevating member, a traveling platform normally upon the tracks of the base member, sheaves adjacent to the base member and the upper end of the elevating member, a cable engaging said sheaves and attached at one end to the traveling platform and arranged so that a sufficient pull upon its free end shall cause said platform to travel upon said alined tracks until its center of gravity is imposed on the dumping extension beyond the pivotal point thereof, means when said platform has attained such position for tripping said dumping extension to permit it to swing downward with the superposed platform to discharge the contents of the latter, a snap hook at the free end of the cable, and a cord for automatically opening said snap hook when the weight of the platform is mainly imposed upon the dumping extension.

4. A manure loader, comprising a base member provided with tracks, an inclined elevating member arranged near the base member and provided with similar alined tracks abutting at their lower ends against the tracks of the base member, a dumping extension at the upper end of the elevating member and bearing a pivoted relation thereto and provided with tracks alined with those of the elevating member, a traveling platform normally upon the tracks of the base member, sheaves adjacent to the base member and the upper end of the elevating member, a cable engaging said sheaves and attached at one end to the traveling platform and arranged so that a sufficient pull upon its free end shall cause said platform to travel upon said alined tracks until its center of gravity is imposed on the dumping extension beyond the pivotal point thereof, means when said platform has attained such position for tripping said dumping extension to permit it to swing downward with the superposed platform to discharge the contents of the latter, a snap hook at the free end of the cable, a cord for automatically opening said snap-hook when the weight of the platform is mainly imposed upon the dumping extension, and means for preventing the platform when in dumping position from sliding or toppling off the dumping extension when depressed.

5. In a manure loading machine, a base member, an elevating member, a dumping extension pivoted to the upper end of the elevating member, a rock shaft having crank arms secured to the dumping extension, a second pair of crank arms, a transverse spring actuated latch bolt carried by and projecting beyond one side of the elevating member and normally engaging one of said second pair of crank arms to prevent dumping action of said extension, a lever carried by the elevating member and connected to the other of said pair of crank arms whereby the dumping extension may be reëlevated, a cam mounted on the latch bolt, a traveling platform provided with a trip pin, and means for causing said platform to travel from the base member upward upon the elevating member until its center of gravity is upon the dumping extension, and its pin engages said cam and effects the repression of said bolt to permit the extension to swing downward with said platform.

6. In a manure loading machine, a base member, an elevating member, a dumping extension pivoted to the upper end of the elevating member, a rock shaft having crank arms secured to the dumping extension, and a second pair of crank arms, a transverse spring-actuated latch-bolt carried by and projecting beyond one side of the elevating member and normally engaging one of said second pair of crank arms to prevent dumping action of said extension, a lever carried by the elevating member and connected to the other of said pair of crank arms, whereby the dumping extension may be reëlevated, a cam mounted on the latch-bolt, a traveling platform provided with a trip pin, means for causing said platform to travel from the base member upward upon the elevating member until its center of gravity is upon the dumping extension, and its pin engages said cam and effects the repression of said bolt to permit the extension to swing downward with said platform, and a latch mechanism to lock the said extension against dumping action.

7. In a manure loading machine, a base member, an elevating member, a dumping extension pivoted to the upper end of the elevating member, a rock shaft having crank arms secured to the dumping extension, and a second pair of crank arms, a transverse spring-actuated latch bolt carried by and projecting beyond one side of the elevating member and normally engaging one of said second pair of crank arms to prevent dumping action of said extension, a lever carried by the elevating member and connected to the other of said pair of crank arms whereby the dumping extension may be reëlevated, a cam mounted on the latch bolt, a traveling platform provided with a trip pin, means for causing said platform to travel from the base member upward upon the elevating member until its center of gravity is upon the dumping extension and its pin engages said cam and effects the repression of said bolt to permit the extension to swing downward with said platform, a notched sector adjacent to said lever, a latch mechanism carried by the lever, and means for securing said latch mechanism in unlocked relation to said sector.

In testimony whereof I affix my signature, in the presence of two witnesses.

JOSEPH C. WALTER.

Witnesses:
J. W. NEEIDER,
W. G. EAST.

---

Copies of this patent may be obtained for five cents each, by addressing the "Commissioner of Patents, Washington, D. C."